2,792,619
Patented May 21, 1957

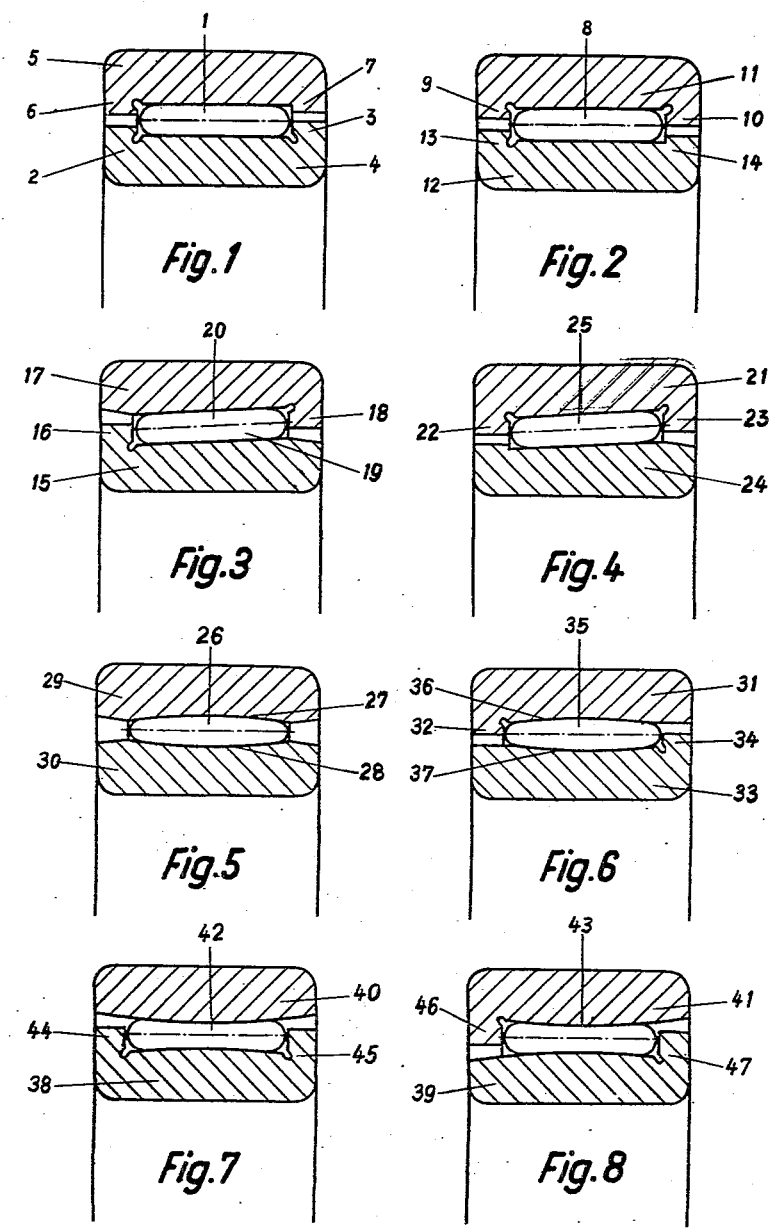

2,792,619

METHOD OF MANUFACTURING NEEDLE ROLLER BEARINGS

Nikolaus Kömm, Schweinfurt, Germany, assignor to Kugelfischer Georg Schäfer & Co., Schweinfurt, Germany, a company of Germany Application March 23, 1953, Serial No. 343,941

2 Claims. (Cl. 29—148.4)

In order fully to utilize the advantage offered by needle roller bearings, this advantage residing in the fact that needle roller bearings combine a low diametral height with a very high load-carrying capacity, it is necessary to incorporate in such bearings the maximum possible number of rolling bodies. One disadvantage of bearings of the type referred to is seen in the fact that they have a tendency of falling apart during handling, the needle rollers frequently moving out of their bearing races. Needle roller bearings have heretofore been known the design of which made it possible, in the case of bearings containing the maximum possible number of needle rollers, to eliminate the above-mentioned deficiency. However, it is necessary with such bearings to provide additional structural elements in order to achieve the desired effect, this resulting in a more complicated design and higher manufacturing costs.

The method according to the invention of manufacturing bearings of the type referred to provides for the elimination of the above-mentioned deficiency by providing for the outer bearing race or ring to be installed while hot. Upon the outer bearing race having cooled down, there will then have been obtained a needle roller bearing the elements of which are prevented from falling apart and cannot be disassembled without special manipulations being performed.

It is contemplated in the case of needle roller bearings manufactured in any of a variety of manners by the above-mentioned method and comprising inner and outer races respectively provided with flanged edges on both ends to provide for modified embodiments of the invention by giving one of the said flanged edges a very low height in order to permit the heat-expanded bearing element or elements to be slid past the said flanged edge and, after the heat-expanded bearing element or elements have cooled down, to cause the said flanged edge to hold all bearing elements together in the form of a permanent assembly. Furthermore, needle roller bearings manufactured by the method just described may be modified in such a manner that the mutually parallel race surfaces of the inner and outer bearing races, respectively, are given a very slight inclination, for example of 30', in relation to the axis of the bearing and that flanged edges are provided either on opposite ends of both bearing races or on both ends of one of the races.

It is of particular advantage, according to the invention, to use the manufacturing method just described for the production of needle roller bearings in which the needle rollers are of convex shape, while bearing race surfaces have concave contours or in which these kinematic conditions are reversed to the effect that the needle rollers are of concave shape, while the bearing race surfaces have convex contours.

Further characteristics of the invention will become apparent from the following description taken in conjunction with the accompanying drawing showing several embodiments of needle roller bearings according to the invention. In the embodiment illustrated in Figures 1 and 2 the axes of the needle rollers are arranged in parallel relationship to the axis of the bearing structure. In the embodiments illustrated in Figures 3 and 4 the axes of the needle rollers have a slight inclination in relation to the axis of the bearing structure. The embodiments shown in Figures 5 and 6 are provided with convex needle rollers, while the race surfaces are of concave shape. The embodiments shown in Figures 7 and 8 are provided with concave needle rollers, while the race surfaces are of convex shape.

The needle roller bearing shown in Figure 1 is obtained by first using a stiff grade of grease to embed the needle rollers 1 in the inner bearing race 4 provided with the flanged edges 2 and 3, by heating the outer bearing race 5 and by then sliding the outer bearing race 5 over the needle rollers, the sliding movement taking place in the direction from left to right in Figure 1. More in particular, this method of assembling the bearing elements is made possible by the fact that, while the flanged edge 6 of the outer bearing race is of substantially standard dimension, the height of the flanged edge 7 is sufficiently low to permit the heat-expanded outer bearing race 5 to be slid over the edge 7, the outer bearing race 5, upon being cooled down, causing the elements 1, 4, and 5 to form a permanent assembly.

In the case of the needle roller bearing shown in Figure 2 it is convenient to use a special grade of grease having a high pour point to embed the needle rollers 8 in the outer bearing race 11 which is provided with the flanged edges 9 and 10. Then the outer bearing race 11 is heated, the special-grade grease preventing the needle rollers 8 from dropping out of the outer race or ring 11. The heating of the outer race 11 causes the latter to expand, it then being possible to insert the inner bearing race 12 from the left to the right in Figure 2. This inserting process, in turn, is made possible by the fact that the left-hand end only of the inner bearing race 12 is provided with a standard-height flanged edge 13, the right-hand end having a flanged edge 14 the height of which is sufficiently small to permit the heat-expanded outer race 11 to be fitted over the inner race 12. As soon as the outer race 11 has cooled down, also the elements of this embodiment will form a permanent assembly which will neither fall apart during handling nor permit disassembly.

Figure 3 illustrates another emodiment of the invention in the form of a needle roller bearing in which the inner race 15 has only a single flanged edge 16 disposed on the left-hand end of the said race, while the outer race 17 has only a single flanged edge 18 which is provided on the right-hand end of the said race. In the embodiment shown in Figure 3, the axes 19 of the needle rollers 20 have a slight inclination, for example of 30', in relation to the axis (not shown) of the bearing structure.

Again referring to Figure 3, the bearing there shown is assembled by first embedding the needle rollers 20 in the inner race 15 in the manner already described, by heating the outer race and by sliding the outer race, while hot, over the needle rollers from the right to the left in Figure 3. After the outer race has cooled down, it will hold the bearing elements together in the form of a permanent assembly.

In the embodiment shown in Figure 4 only the outer race 21 is provided with flanged edges 22 and 23, while the inner race 24 has no flanged edges. This bearing structure is assembled by embedding the needle rollers 25 in the outer race 21, for example with the aid of special-grade grease. The outer race 21 then being heated in order to permit the inner race 24 to be inserted from the left to the right in Figure 4.

While in the case of the embodiments illustrated in Figures 1 and 2 it is possible to impose on the bearings slight axial thrust loads which are exclusively absorbed by the flanged edges provided on the bearing races, such thrust loads may also be taken by the embodiments shown in Figures 3 and 4; in the latter case, however, the needle rollers, due to their inclination relative to the bearing axis, assist the flanged borders in their thrust-absorbing action by absorbing a very slight amount of thrust.

The embodiment shown in Figure 5 has needle rollers 26 of convex shape, the race surfaces of the outer bearing race 29 and the inner bearing race 30, respectively, being provided with correspondingly shaped concave profiles. The bearings of this type are assembled by causing the inner race 30 to support the needle rollers 26 and by sliding the heated outer race 29 over the needle rollers, the cooling-down of the outer race then causing the latter to hold the bearing elements together in the form of a permanent assembly.

The needle roller bearing illustrated in Figure 6 differs from the bearing shown in Figure 5 only in that the outer race 31 is provided with a flanged edge 32, while the inner race 33 is provided with a flanged edge 34. In this case, too, the needle rollers 35 are of convex shape, while the race surfaces 36 and 37 with which the said rollers cooperate are of corresponding concave shape. In order to assemble this bearing, the heated outer race 31 is slid from left to right over the convex needle rollers 35 which are embedded in the inner race 33.

In the embodiments illustrated in Figures 7 and 8, needle rollers 42 and 43, respectively, of concave shape are arranged between the inner races 38 or 39 and the outer races 40 or 41, respectively. In the case of the bearing shown in Figure 7 the inner race 38 is provided with the flanged edges 44 and 45, while in the case of the bearing shown in Figure 8 the race 39 has a single flanged edge 46 and the race 41 has a single flanged edge 47.

The bearings represented in Figures 7 and 8 are assembled by sliding the heated outer races 40 and 41, respectively over the needle rollers 42 and 43, which are respectively embedded in the inner races 38 and 39. Again the cooling-down of the outer races will cause the latter to hold the bearing elements together in the form of permanent assemblies.

I claim:

1. A method of assembling needle roller bearings of the type comprising an inner race, an outer race having an inside diameter larger than the outside diameter of said inner race, a plurality of needle rollers, and retaining flanges on the ends of the races adapted to limit endwise movement of the needle rollers, comprising the steps of embedding said plurality of needle rollers in grease in one of said races, heating the outer race to expand same sufficiently to receive the inner race with the needle rollers in place in said one of the races, the height of the flanges being sufficiently low to allow the inner race to be received in the outer race, placing said races in axial alignment, with the outer race in heated condition, applying end thrust, while said outer race is in its heated condition, on at least one of said races in a direction to slide the races axially together and sufficient to position said races concentrically, with the retaining flanges located at the respective opposite ends of the assembly, and cooling said outer race, whereby an integrated needle roller bearing structure is produced, the races of which are not easily separated.

2. A method of assembling needle roller bearings of the type comprising an inner race, an outer race having an inside diameter larger than the outside diameter of said inner race, a plurality of needle rollers, and retaining flanges on the ends of the races adapted to limit endwise movement of the needle rollers, comprising the steps of embedding the needle rollers in grease in one of said races, temporarily changing the temperature of one of said races from ambient temperature sufficiently to alter the dimensions of same so that said races, with the needle rollers embedded in grease in one of said races, can be coaxially and concentrically positioned together, the height of the flanges being sufficiently low to allow the inner race to be received in the outer race, placing said races in axial alignment, applying end thrust on at least one of said races in a direction to slide the races axially together and sufficient to position said races concentrically with the retaining flanges located at the respective opposite ends of the assembly, and returning the temperature of the altered race back to ambient temperature, whereby an integrated needle roller bearing structure is produced, the races of which are not easily separated.

References Cited in the file of this patent
UNITED STATES PATENTS

| | | |
|---|---|---|
| 881,471 | Hoffmann | Mar. 10, 1908 |
| 1,419,521 | Rockwell | June 13, 1922 |
| 1,947,004 | Goodard et al. | Feb. 13, 1934 |
| 2,142,474 | Langhaar | Jan. 3, 1939 |
| 2,160,382 | Heim | May 30, 1939 |